R. B. DISBROW.
INNER TUBE.
APPLICATION FILED JUNE 16, 1919.
1,384,244.
Patented July 12, 1921.
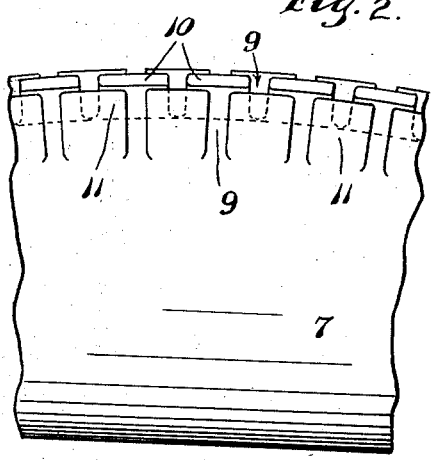
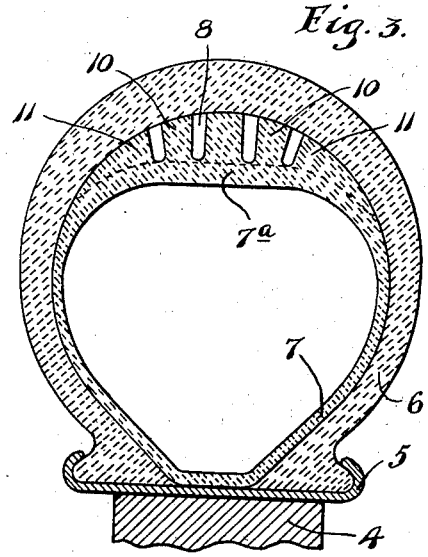
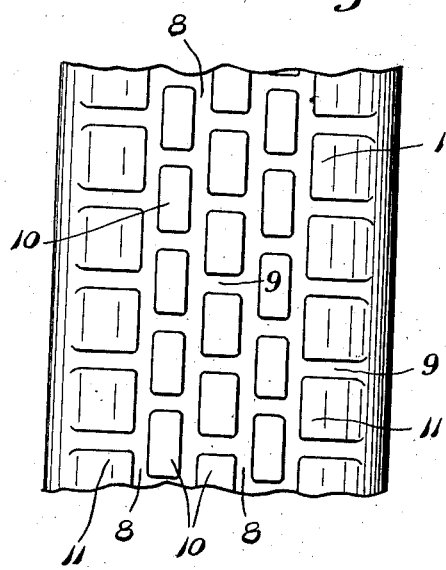
INVENTOR.
R. B. DISBROW.
BY HIS ATTORNEYS.

UNITED STATES PATENT OFFICE.

REUBEN B. DISBROW, OF ST. PAUL, MINNESOTA.

INNER TUBE.

1,384,244.   Specification of Letters Patent.   Patented July 12, 1921.

Application filed June 16, 1919. Serial No. 304,574.

*To all whom it may concern:*

Be it known that I, REUBEN B. DISBROW, a citizen of the United States, residing at St. Paul, in the county of Ramsey and State of Minnesota, have invented certain new and useful Improvements in Inner Tubes; and I do hereby declare the following to be a full, clear, and exact description of the invention, such as will enable others skilled in the art to which it appertains to make and use the same.

My invention relates to pneumatic tires and has for its object to provide an improved inner tube therefor.

The invention consists in providing the inner tube, at its outer portion, that is, in that portion that engages the tread of the casings, with increased thickness and in providing this increased thickness with a multiplicity of projecting bearing bosses or lugs spaced from each other so that they increase the elasticity of the tire and at the same time prevent the inner tube from being punctured by plugs and other sharp articles, such as small nails that may pass through the casing into the inner tube.

The invention is illustrated in the accompanying drawings wherein like characters indicate like parts throughout the several views.

Referring to the drawings:

Figure 1 is a view showing a portion of the tread of the inner tube;

Fig. 2 is a side elevation of the inner tube section shown in Fig. 1; and

Fig. 3 is a transverse section taken through the inner tube and through a casing and rim to which it is applied.

Of the parts shown in Fig. 3, the numeral 4 indicates the wheel felly, the numeral 5 the wheel rim, the numeral 6 the tire casing and the numeral 7 the inner tube, which latter is also shown in Figs. 1 and 2. The said parts 4, 5 and 6 are of the usual or any suitable construction but the inner tube, in accordance with my invention, is at its outer portion 7ª made relatively very thick, preferably being about 4 or 6 times as thick as the body or main portion of said inner tube.

The thick outer portion of the inner tube on its outer face is formed with longitudinal grooves or channels 8 and transverse grooves or channels 9 that form lugs 10 and 11. Preferably the said grooves and channels are so run that the bearing lugs will be arranged in longitudinally alined rows but will be staggered transversely of the tire. These grooves and channels permit the bosses to move laterally thereby greatly increasing the elasticity of the inner tube. Obviously, any small nail or tack that may work its way through the casing and into the thick portion, that is into the lugs 10—11 or into the channels between the same will not puncture the inner tube and hence will not deflate the tire.

An inner tube constructed as above described will have the further advantage that it will be as flexible as an ordinary inner tube and as easily applied in a casing or removed therefrom when deflated or partly deflated. The cost of this inner tube is not greatly in excess of that of an ordinary inner tube and the advantages derived from usage are very great. In fact, tire troubles will be greatly reduced.

What I claim is:

An inner tube for pneumatic tires having its outer portion relatively thick and formed with circumferential and transverse exterior channels forming rectangular bearing lugs for engagement with the inner surface of the tire casing, the thickness of the tire below the bottom of said lugs being greater than that at the inner portion of the tire, the bearing lugs being arranged in longitudinal rows but staggered transversely of the tire.

In testimony whereof I affix my signature in presence of two witnesses.

REUBEN B. DISBROW.

Witnesses:
CLARA DEMAREST,
MARY GREENBERG.